(12) United States Patent
Hirata et al.

(10) Patent No.: US 10,940,856 B2
(45) Date of Patent: Mar. 9, 2021

(54) DRIVING ASSISTANCE SYSTEM

(71) Applicant: MITSUBISHI ELECTRIC CORPORATION, Tokyo (JP)

(72) Inventors: Akira Hirata, Tokyo (JP); Takehiko Hanada, Tokyo (JP); Masahiro Abukawa, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 286 days.

(21) Appl. No.: 15/780,172

(22) PCT Filed: Jan. 18, 2016

(86) PCT No.: PCT/JP2016/051312
§ 371 (c)(1),
(2) Date: May 30, 2018

(87) PCT Pub. No.: WO2017/126012
PCT Pub. Date: Jul. 27, 2017

(65) Prior Publication Data
US 2018/0362034 A1 Dec. 20, 2018

(51) Int. Cl.
*B60W 30/09* (2012.01)
*B60W 30/095* (2012.01)
(Continued)

(52) U.S. Cl.
CPC .......... *B60W 30/095* (2013.01); *B60Q 5/005* (2013.01); *B60W 30/09* (2013.01);
(Continued)

(58) Field of Classification Search
CPC .................................................. B60W 30/095
See application file for complete search history.

(56) References Cited

U.S. PATENT DOCUMENTS 6,246,961 B1 * 6/2001 Sasaki .................... G08G 1/167
701/301
9,187,091 B2 * 11/2015 Mills .................... B60W 40/107
(Continued)

FOREIGN PATENT DOCUMENTS

DE   20 2009 000 016 U1   9/2009
DE   10 2010 008 208 A1   8/2011
(Continued)

OTHER PUBLICATIONS

Office Action issued in corresponding German Application No. 11 2016 005 851.9 dated Oct. 31, 2018.
(Continued)

*Primary Examiner* — Alex C Dunn
(74) *Attorney, Agent, or Firm* — Birch, Stewart, Kolasch & Birch, LLP

(57) ABSTRACT

A crossing detection unit (21) detects a pedestrian who is about to cross a roadway on which a vehicle (100) travels. A behavior detection unit (22) detects a behavior of a nearby vehicle traveling around the vehicle (100). A stop determination unit (23) determines whether or not to stop the vehicle (100) in view of the detection of the pedestrian who is about to cross the roadway by the crossing detection unit (21) and the behavior of the nearby vehicle detected by the behavior detection unit (22). A vehicle control unit (24) stops the vehicle (100) before the pedestrian when the stop determination unit (23) determines to stop the vehicle.

18 Claims, 15 Drawing Sheets

(51) Int. Cl.
  *B60W 40/02* (2006.01)
  *B60Q 5/00* (2006.01)
  *G08G 1/005* (2006.01)
  *G08G 1/16* (2006.01)
  *B60R 1/00* (2006.01)

(52) U.S. Cl.
  CPC .... *B60W 30/0953* (2013.01); *B60W 30/0956* (2013.01); *B60W 40/02* (2013.01); *G08G 1/005* (2013.01); *G08G 1/166* (2013.01); *B60R 1/00* (2013.01); *B60W 2554/00* (2020.02); *B60W 2554/80* (2020.02)

(56) References Cited

U.S. PATENT DOCUMENTS

| | | | |
|---|---|---|---|
| 2010/0211267 A1* | 8/2010 | Shimazaki | B62D 15/028 701/42 |
| 2012/0300072 A1* | 11/2012 | Kim | B60R 1/00 348/148 |
| 2014/0062685 A1 | 3/2014 | Tamatsu et al. | |
| 2014/0225721 A1* | 8/2014 | Simon | B60K 35/00 340/435 |
| 2014/0309884 A1* | 10/2014 | Wolf | G06K 9/00805 701/41 |
| 2014/0324330 A1 | 10/2014 | Minemura et al. | |
| 2015/0002620 A1* | 1/2015 | Shin | B60W 30/095 348/36 |
| 2015/0206001 A1 | 7/2015 | Maurer et al. | |
| 2015/0334269 A1* | 11/2015 | Yokota | G06T 7/251 382/103 |
| 2015/0344028 A1* | 12/2015 | Gieseke | B62D 15/028 701/1 |
| 2017/0327112 A1* | 11/2017 | Yokoyama | G06K 9/00335 |

FOREIGN PATENT DOCUMENTS

| | | |
|---|---|---|
| DE | 10 2014 105 722 A1 | 10/2014 |
| DE | 10 2014 201 159 A1 | 7/2015 |
| JP | 2006-244295 A | 9/2006 |
| JP | 2008-282097 A | 11/2008 |
| JP | 2008-287678 A | 11/2008 |
| JP | 2011-210095 A | 10/2011 |
| JP | 2012-234499 A | 11/2012 |
| JP | 2012-238185 A | 12/2012 |
| JP | 2013-149296 A | 8/2013 |
| JP | 2014-6700 A | 1/2014 |
| JP | 2014-46838 A | 3/2014 |
| JP | 2014-93040 A | 5/2014 |
| JP | 2015-32028 A | 2/2015 |
| WO | WO 2011/101014 A1 | 8/2011 |

OTHER PUBLICATIONS

International Search Report for PCT/JP2016/051312 (PCT/ISA/210) dated Apr. 5, 2016.
Office Action dated Nov. 24, 2020 in corresponding German Application No. 11 2016 005 851.9.

\* cited by examiner

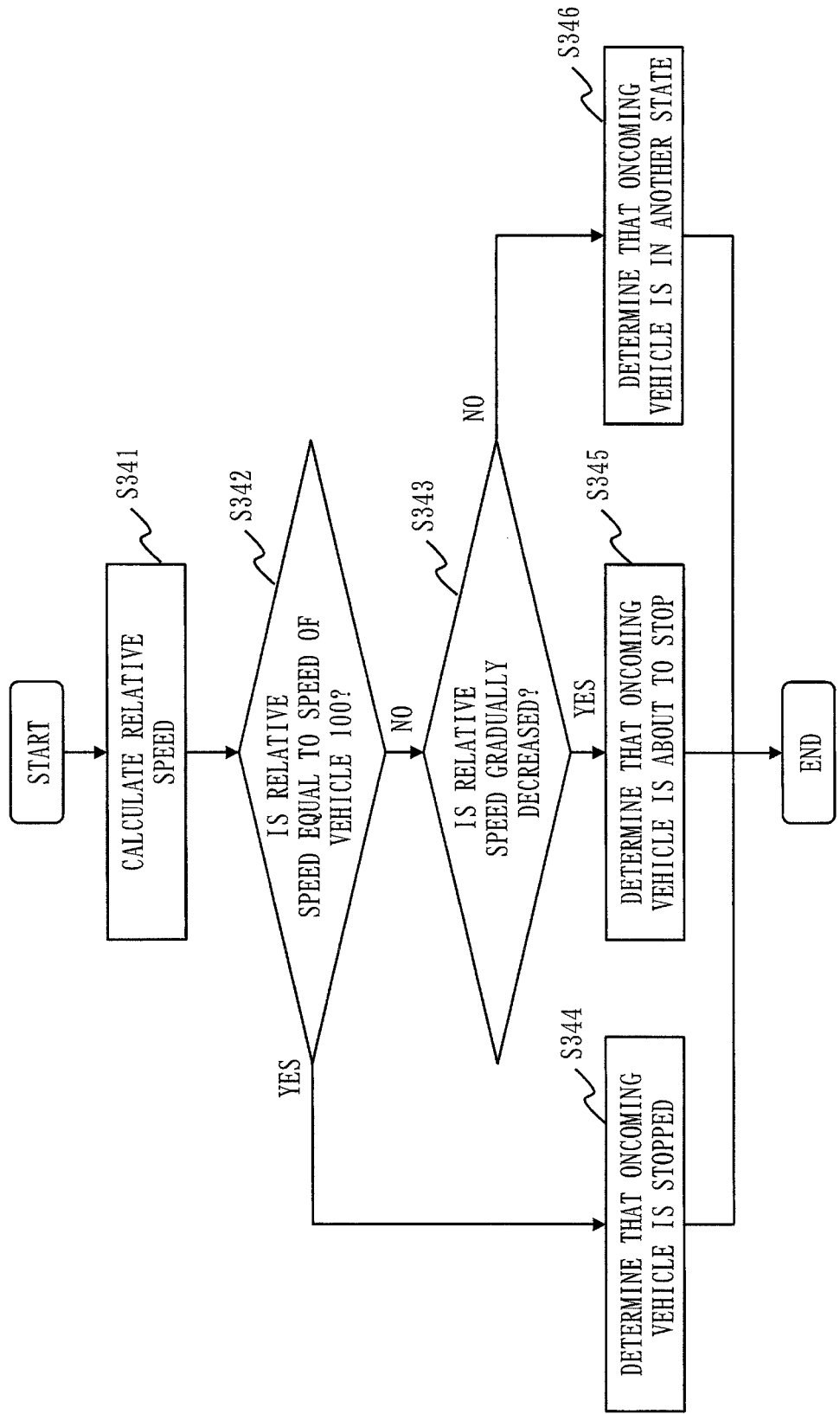

DRIVING ASSISTANCE SYSTEM

TECHNICAL FIELD

The present invention relates to a technique for determining whether or not to stop a vehicle when the vehicle approaches a pedestrian.

BACKGROUND ART

Studies have been conducted on a technique for avoiding or reducing an impact of a collision between a vehicle and another vehicle or a pedestrian by using a camera and a sensor mounted on a vehicle.

Patent Literature 1 describes performing brake control by estimating whether a pedestrian is about to cross a roadway from the orientation of the body and face of the pedestrian.

CITATION LIST

Patent Literature

Patent Literature 1: JP 2008-282097 A

SUMMARY OF INVENTION

Technical Problem

The technique described in Patent Literature 1 performs brake control to avoid a collision of a vehicle with the pedestrian when the pedestrian is about to cross the roadway. The technique described in Patent Literature 1 however considers only the pedestrian who is about to cross the roadway, so that brake control performed on the basis of the technique described in Patent Literature 1 possibly increases a risk of collision with another vehicle.

The present invention aims at appropriately determining whether or not to stop a vehicle.

Solution to Problem

A driving assistance system according to the present invention includes:

a crossing detection unit to detect a pedestrian who is about to cross a roadway on which a vehicle travels;

a behavior detection unit to detect a behavior of a nearby vehicle traveling around the vehicle;

a stop determination unit to determine whether or not to stop the vehicle in view of detection of the pedestrian who is about to cross the roadway by the crossing detection unit and the behavior of the nearby vehicle detected by the behavior detection unit; and a vehicle control unit to stop the vehicle before the pedestrian when the stop determination unit determines to stop the vehicle.

Advantageous Effects of Invention

The present invention determines whether or not to stop the vehicle in view of not only the detection of the pedestrian who is about to cross the roadway but also the behavior of the nearby vehicle. Therefore, a determination on whether or not to stop the vehicle can be made appropriately.

BRIEF DESCRIPTION OF DRAWINGS

FIG. 15 is a flowchart of step S34 in FIG. 13 according to the second embodiment.

DESCRIPTION OF EMBODIMENTS

First Embodiment

Figure 1:
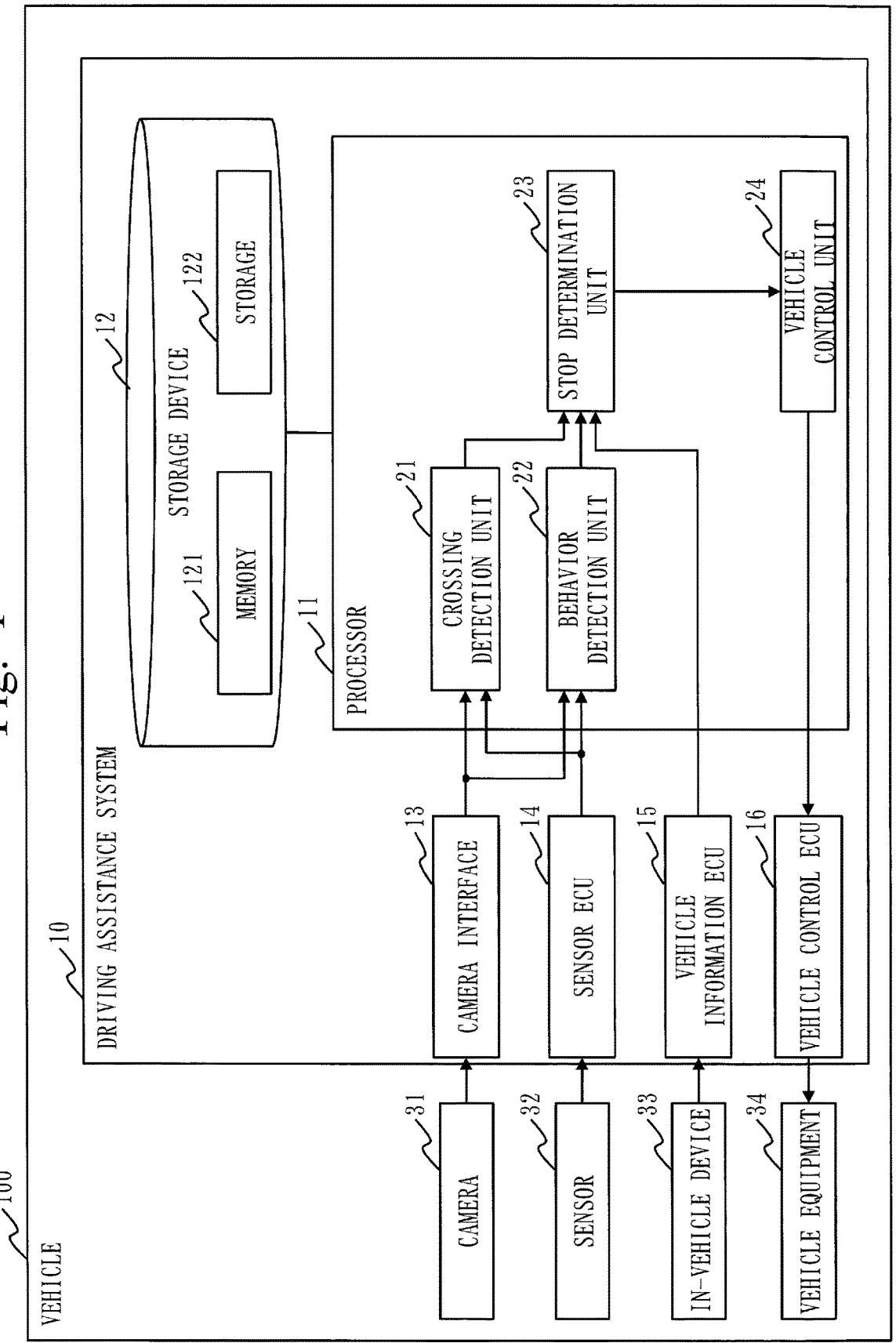
FIG. 1 is a block diagram of a driving assistance system 10 according to a first embodiment.

A first embodiment describes a driving assistance system 10 that determines whether or not to stop a vehicle 100 depending on the behavior of a following vehicle, when a pedestrian who is about to cross a roadway is detected.

Description of Configuration

The configuration of the driving assistance system 10 according to the first embodiment will be described with reference to FIG. 1.

The driving assistance system 10 is a computer mounted in the vehicle 100.

The driving assistance system 10 includes a processor 11, a storage device 12, a camera interface 13, a sensor electronic control unit (ECU) 14, a vehicle information ECU 15, and a vehicle control ECU 16. The processor 11 is connected to other hardware via a signal line to control the other hardware.

The processor 11 is an integrated circuit (IC) that performs processing. The processor 11 is specifically a central processing unit (CPU), a digital signal processor (DSP), or a graphics processing unit (GPU).

The storage device 12 includes a memory 121 and a storage 122. The memory 121 is specifically a random access memory (RAM). The storage 122 is specifically a hard disk drive (HDD). Alternatively, the storage 122 may be a portable storage medium such as a Secure Digital (SD) memory card, a CompactFlash (CF), a NAND flash, a flexible disk, an optical disk, a compact disk, a Blu-ray (registered trademark) disk, or a DVD.

The camera interface 13 is a device that connects a camera 31 which is mounted in the vehicle 100 to photograph the front and rear of the vehicle 100.

The sensor ECU 14 is a device that controls a sensor 32 for detecting an object around the vehicle 100, the sensor including a millimeter wave sensor and a laser sensor mounted in the vehicle 100.

The vehicle information ECU 15 is a device that controls an in-vehicle device 33 acquiring vehicle information of the vehicle 100, the in-vehicle device including a speed pulse sensor, an acceleration sensor, and a Global Positioning System (GPS) receiver mounted in the vehicle 100. The speed pulse sensor is a device detecting the speed of the vehicle 100. The acceleration sensor is a device detecting the acceleration of the vehicle 100. The GPS receiver is a device receiving a positioning signal that is transmitted from a GPS satellite to allow detection of the position of the vehicle 100.

The vehicle control ECU 16 is a device controlling vehicle equipment 34 such as an accelerator, a brake, an engine, and a light mounted in the vehicle 100.

The driving assistance system 10 includes a crossing detection unit 21, a behavior detection unit 22, a stop determination unit 23, and a vehicle control unit 24 as functional configurations. The function of each of the crossing detection unit 21, the behavior detection unit 22, the stop determination unit 23, and the vehicle control unit 24 is implemented in software.

The storage 122 in the storage device 12 stores a program for implementing the function of each unit of the driving assistance system 10. This program is loaded into the memory 121 by the processor 11 and executed by the processor 11. The function of each unit of the driving assistance system 10 is thus implemented.

Information, data, a signal value, and a variable value representing a result of functional processing of each unit implemented by the processor 11 are stored in the memory 121 or in a register or cache memory within the processor 11. The following description assumes that the information, the data, the signal value, and the variable value representing the result of the functional processing of each unit implemented by the processor 11 are stored in the memory 121.

It is assumed above that the program executed by the processor 11 to implement each function is stored in the storage device 12. However, this program may be stored in a portable storage medium such as a magnetic disk, a flexible disk, an optical disk, a compact disk, a Blu-ray (registered trademark) disk, or a DVD.

FIG. 1 illustrates only one processor 11. However, a plurality of the processors 11 may be included to execute the program implementing each function in coordination with one another.

Description of Operation

The operation of the driving assistance system 10 according to the first embodiment will be described with reference to FIGS. 2 to 10.

The operation of the driving assistance system 10 according to the first embodiment corresponds to a driving assistance method according to the first embodiment. The operation of the driving assistance system 10 according to the first embodiment further corresponds to processing of a driving assistance program according to the first embodiment.

The overview of the operation of the driving assistance system 10 according to the first embodiment will be described with reference to FIG. 2.

Figure 2:
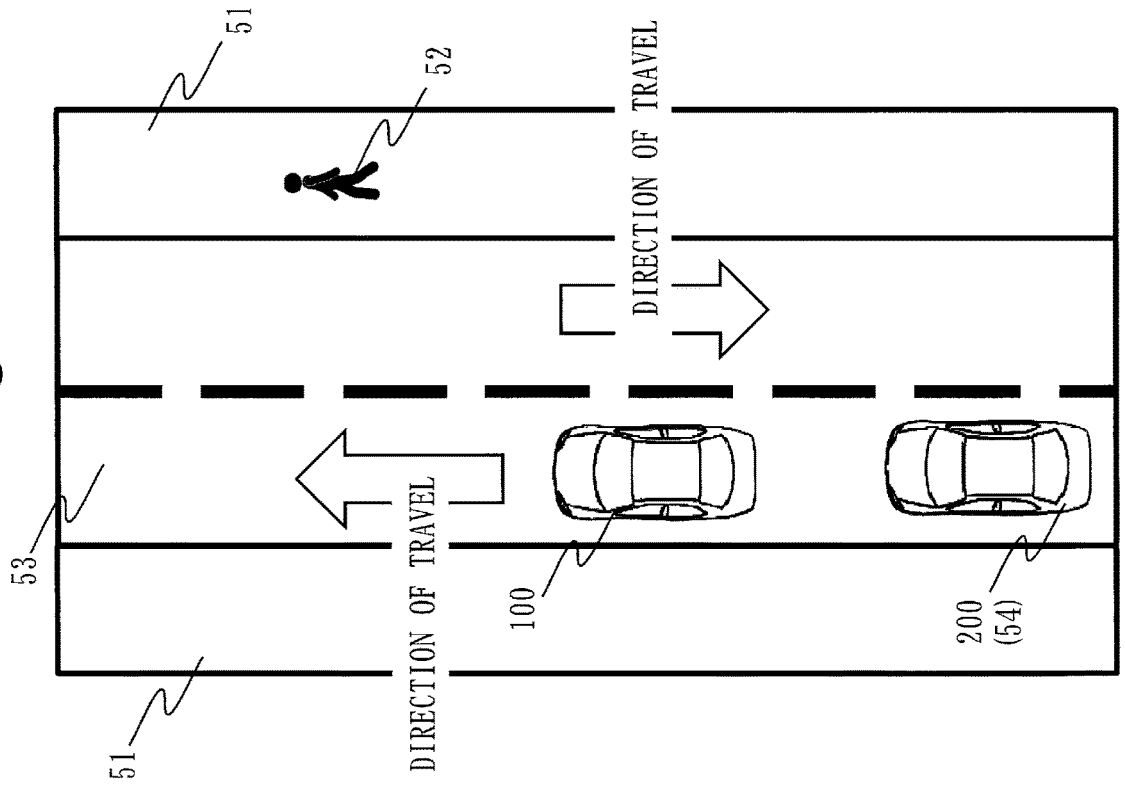
FIG. 2 is an illustrative diagram of an overview of the operation of the driving assistance system 10 according to the first embodiment.

As illustrated in FIG. 2, there is a case where a pedestrian 52 on a sidewalk 51 ahead of the vehicle 100 is about to cross a roadway 53 on which the vehicle 100 travels.

The crossing detection unit 21 uses the camera 31 and the sensor 32 to detect the pedestrian 52 who is about to cross the roadway 53 on which the vehicle 100 travels. When the pedestrian 52 is about to cross the roadway 53, the stop determination unit 23 causes the vehicle control unit 24 to stop the vehicle 100 before the pedestrian 52.

However, stopping the vehicle 100 in view of the pedestrian 52 alone possibly increases a risk of collision between the vehicle 100 and a nearby vehicle 200 depending on the behavior of the nearby vehicle 200 traveling around the vehicle 100. The behavior detection unit 22 thus detects the behavior of the nearby vehicle 200 traveling around the vehicle 100. Then, when the pedestrian 52 who is about to cross the roadway 53 is detected, the stop determination unit 23 determines whether or not to stop the vehicle 100 depending on the behavior of the nearby vehicle 200.

Specifically, in the presence of a following vehicle 54 which is the nearby vehicle 200 traveling behind the vehicle 100, a risk of collision of the following vehicle 54 with the vehicle 100 is caused by deceleration of the vehicle 100. The behavior detection unit 22 thus uses the camera 31 and the sensor 32 to detect relative acceleration of the following vehicle 54 with respect to the vehicle 100 as the behavior. Then, when the relative acceleration of the vehicle 100 is less than or equal to the deceleration, the stop determination unit 23 determines to stop the vehicle 100 assuming that there is no risk of collision of the following vehicle 54 with the vehicle 100. On the other hand, when the relative acceleration of the vehicle 100 is greater than the deceleration, the stop determination unit 23 determines not to stop the vehicle 100 assuming that there is a risk of collision of the following vehicle 54 with the vehicle 100.

The detailed operation of the driving assistance system 10 according to the first embodiment will be described with reference to FIG. 3.

In step S11, the crossing detection unit 21 acquires image data of a region in front of the vehicle 100 photographed by the camera 31 that is connected via the camera interface 13. The crossing detection unit 21 also acquires object information around the vehicle 100 detected by the sensor 32 that is connected via the sensor ECU 14.

In step S12, the crossing detection unit 21 detects a pedestrian 52 in the direction of travel of the vehicle 100 from the image data and the object information acquired in step S11.

The crossing detection unit 21 advances the processing to step S13 if the pedestrian 52 is detected, or returns the processing to step S11 if the pedestrian 52 is not detected.

In step S13, the crossing detection unit 21 determines whether or not the pedestrian 52 detected in step S12 is about to cross the roadway 53 from the image data and the object information acquired in step S11.

The crossing detection unit 21 advances the processing to step S14 if the pedestrian 52 is about to cross the roadway, or returns the processing to step S11 if the pedestrian 52 is not about to cross the roadway.

In step S14, the stop determination unit 23 instructs the vehicle control unit 24 to perform deceleration. The vehicle control unit 24 then controls the accelerator and the brake, which are the vehicle equipment 34 connected via the vehicle control ECU 16, thereby starting to decelerate the vehicle 100.

In step S15, the behavior detection unit 22 acquires image data of a region behind the vehicle 100 photographed by the camera 31 that is connected via the camera interface 13. The behavior detection unit 22 also acquires object information around the vehicle 100 detected by the sensor 32 that is connected via the sensor ECU 14.

In step S16, the behavior detection unit 22 detects a following vehicle 54 traveling behind the vehicle 100 from the image data and the object information acquired in step S15.

The behavior detection unit 22 advances the processing to step S17 if the following vehicle 54 is detected, or advances the processing to step S18 if the following vehicle 54 is not detected.

In step S17, the behavior detection unit 22 determines whether or not there is a risk of collision of the following vehicle 54 detected in step S16 with the vehicle 100 from the image data and the object information acquired in step S15.

The behavior detection unit 22 advances the processing to step S20 if there is a risk of collision, or advances the processing to step S18 if there is no risk of collision.

In step S18, the stop determination unit 23 acquires the speed and acceleration of the vehicle 100 from the speed sensor and the acceleration sensor which are the vehicle equipment 34 connected via the vehicle control ECU 16. Then, from the speed and acceleration of the vehicle 100, the stop determination unit 23 determines whether or not the vehicle 100 can be stopped before the pedestrian 52 detected in step S12 by proper deceleration. Proper deceleration is deceleration that does not cause symptoms such as a cervical problem to an occupant such as a driver of the vehicle 100 and does not cause discomfort to the occupant.

The stop determination unit 23 advances the processing to step S19 if the vehicle can be stopped, or advances the processing to step S20 if the vehicle cannot be stopped.

In step S19, the stop determination unit 23 determines to stop the vehicle 100.

The stop determination unit 23 then instructs the vehicle control unit 24 to perform stopping. Accordingly, the vehicle control unit 24 controls the brake which is the vehicle equipment 34 connected via the vehicle control ECU 16, thereby stopping the vehicle 100 before the pedestrian 52 detected in step S12.

In step S20, the stop determination unit 23 determines not to stop the vehicle 100.

The stop determination unit 23 then instructs the vehicle control unit 24 to stop deceleration. Accordingly, the vehicle control unit 24 stops controlling the brake which is the vehicle equipment 34 connected via the vehicle control ECU 16, thereby stopping deceleration of the vehicle 100.

Note that the vehicle control unit 24 may decelerate the vehicle 100 to such a degree that although the vehicle 100 does not stop, the following vehicle 54 does not collide therewith. This makes it easier to avoid the pedestrian 52 when the pedestrian 52 runs out, for example.

In step S21, the crossing detection unit 21 determines whether or not the pedestrian 52 is done crossing the roadway 53 on which the vehicle 100 travels from the position of the pedestrian 52 detected in step S12.

The crossing detection unit 21 advances the processing to step S22 if the pedestrian is done crossing, or executes step S21 again after the lapse of a predetermined time if the pedestrian is not done crossing.

In step S22, the stop determination unit 23 determines to discontinue the stopping of the vehicle 100.

The stop determination unit 23 then instructs the vehicle control unit 24 to discontinue the stopping. Accordingly, the vehicle control unit 24 stops controlling the brake which is the vehicle equipment 34 connected via the vehicle control ECU 16, thereby discontinuing the stopping of the vehicle 100. The vehicle control unit 24 also controls the lamp or the like which is the vehicle equipment 34 connected via the vehicle control ECU 16, thereby notifying the driver of the vehicle 100 that the stop control is ended.

Step S12 in FIG. 3 according to the first embodiment will be described with reference to FIG. 4.

In step S121, the crossing detection unit 21 extracts partial image data corresponding to the sidewalk 51 from the image data acquired in step S11.

Specifically, the crossing detection unit 21 identifies a part corresponding to the sidewalk 51 by detecting a line drawn on the road or a structure separating the roadway 53 and the sidewalk 51 from the image data, and extracts the partial image data corresponding to the sidewalk 51 being identified.

In step S122, the crossing detection unit 21 uses an image recognition technology to detect the pedestrian 52 from the partial image data extracted in step S121.

The image recognition technology specifically refers to pattern matching. That is, the crossing detection unit 21 performs pattern matching with the partial image data by using pattern data for the pedestrian 52 stored in advance in the storage device 12, and detects the pedestrian 52. The pattern data for the pedestrian 52 is data representing features of the pedestrian 52.

The crossing detection unit 21 advances the processing to step S123 if the pedestrian 52 is detected, or ends the processing if the pedestrian 52 is not detected.

In step S123, the crossing detection unit 21 calculates the distance from the vehicle 100 to the pedestrian 52 detected in step S122 on the basis of the image data and the object information acquired in step S11.

Specifically, the crossing detection unit 21 calculates the distance by a motion stereo method that calculates a distance from a difference between frames of the image data. Alternatively, the crossing detection unit 21 calculates the distance by a stereo camera method that calculates a distance from a parallax between the image data captured by a plurality of the cameras 31. Yet alternatively, the crossing detection unit 21 calculates the distance by a time-of-flight method that calculates a distance from a difference between the radiation time of light radiated from the sensor 32 and the reception time of reflected light.

The crossing detection unit 21 may calculate the distance by another method.

Figure 5:
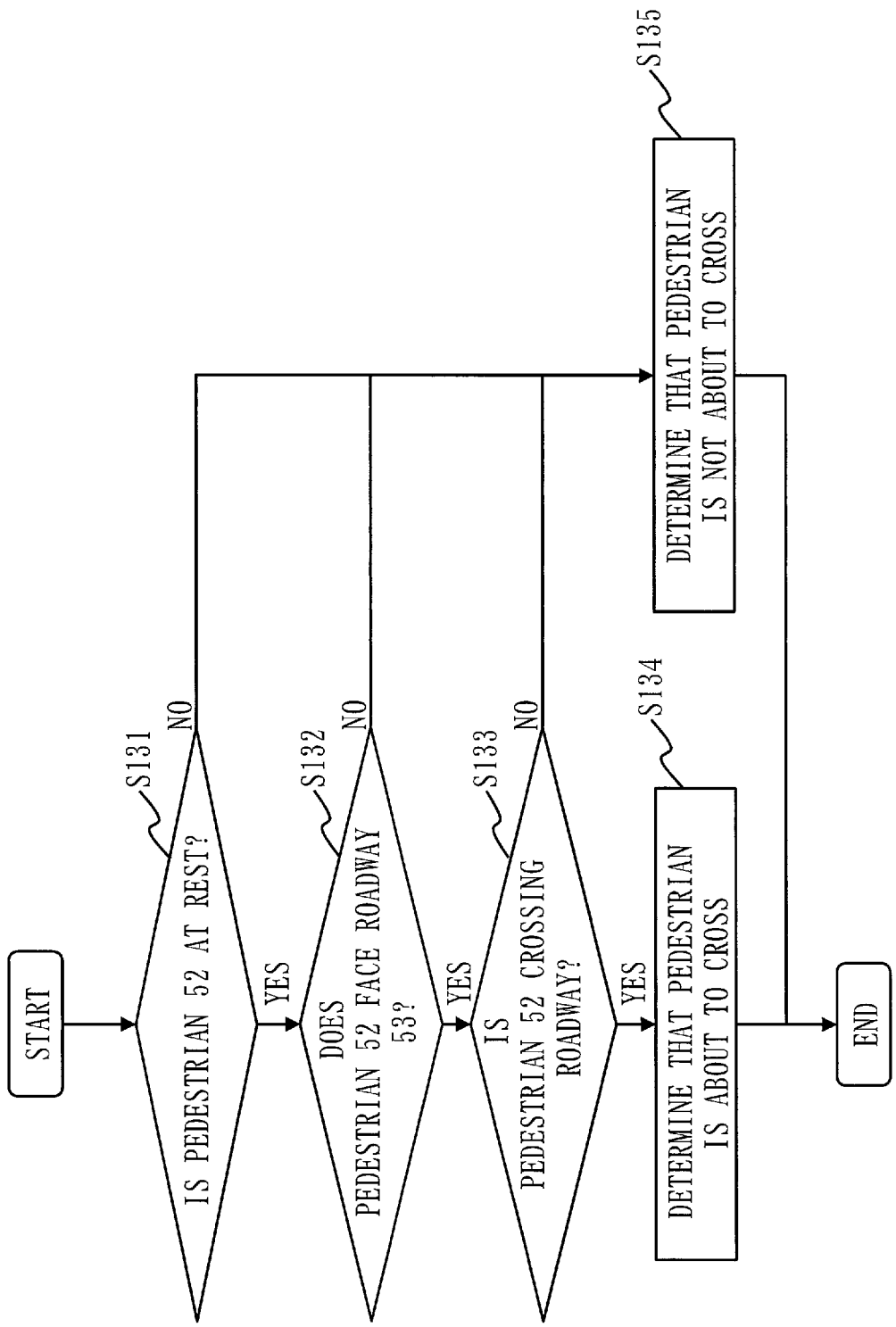
FIG. 5 is a flowchart of step S13 in FIG. 3 according to the first embodiment.

Step S13 in FIG. 3 according to the first embodiment will be described with reference to FIG. 5.

In step S131, the crossing detection unit 21 calculates traveling speed of the pedestrian 52 from a temporal change in the distance calculated in step S123 and the speed of the vehicle 100 included in the object information acquired in step S11.

The crossing detection unit 21 advances the processing to step S132 if the traveling speed is a speed at which the pedestrian is assumed to be at rest, or advances the processing to step S135 if the traveling speed is a speed at which the pedestrian is not assumed to be at rest.

In step S132, the crossing detection unit 21 uses the image recognition technology to identify the orientation of the body of the pedestrian 52 detected in step S122.

The image recognition technology specifically refers to pattern matching. That is, the crossing detection unit 21 performs pattern matching with the image data of the pedestrian 52 detected in step S122 by using pattern data for the pedestrian 52 standing sideways stored in advance in the storage device 12, thereby identifying the orientation of the body of the pedestrian 52.

The crossing detection unit 21 advances the processing to step S133 if the pedestrian 52 faces the roadway 53, or advances the processing to step S135 if the pedestrian 52 does not face the roadway 53.

In step S133, the crossing detection unit 21 uses the image recognition technology to identify the body movement of the pedestrian 52 detected in step S122. Specifically, the crossing detection unit 21 identifies an arm movement of the pedestrian 52, a look direction of the pedestrian 52, and a face movement of the pedestrian 52.

The crossing detection unit 21 extracts image data of the arm of the pedestrian 52 by pattern matching and performs movement recognition to identify whether or not the pedestrian 52 is raising his arm. The crossing detection unit 21 also analyzes the line of sight of the pedestrian 52 to identify whether or not the pedestrian 52 is looking at the vehicle 100. Moreover, the crossing detection unit 21 extracts image data of the face of the pedestrian 52 by pattern matching and performs movement recognition to identify whether or not the pedestrian 52 is moving his face from side to side to check the sides.

The crossing detection unit 21 advances the processing to step S134 assuming that the pedestrian 52 is crossing the roadway if the pedestrian 52 is raising his arm, looking at the vehicle 100, or checking the sides, or advances the processing to step S135 if none of the above is the case.

In step S134, the crossing detection unit 21 determines that the pedestrian 52 is about to cross the roadway 53. On the other hand, in step S135, the crossing detection unit 21 determines that the pedestrian 52 is not about to cross the roadway 53.

Figure 6:
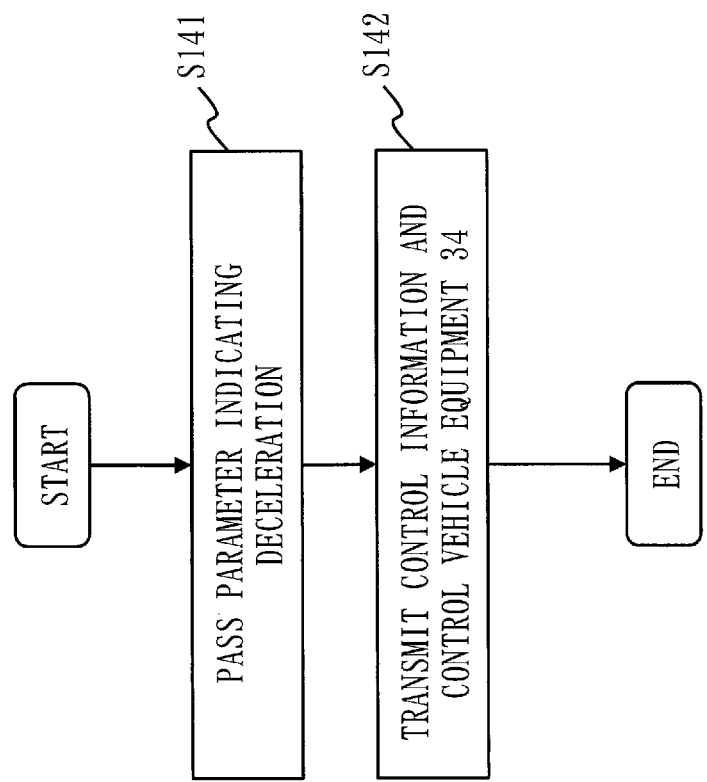
FIG. 6 is a flowchart of step S14 in FIG. 3 according to the first embodiment.

Step S14 in FIG. 3 according to the first embodiment will be described with reference to FIG. 6.

In step S141, the stop determination unit 23 passes a parameter indicating deceleration to the vehicle control unit 24. Specifically, the stop determination unit 23 passes the parameter to the vehicle control unit 24 via inter-process communication or the memory 121.

In step S142, the vehicle control unit 24 generates control information in accordance with the parameter passed in step S141, and transmits the control information to the vehicle control ECU 16. As a result, the vehicle control ECU 16 controls the accelerator and the brake which are the vehicle equipment 34.

Figure 3:
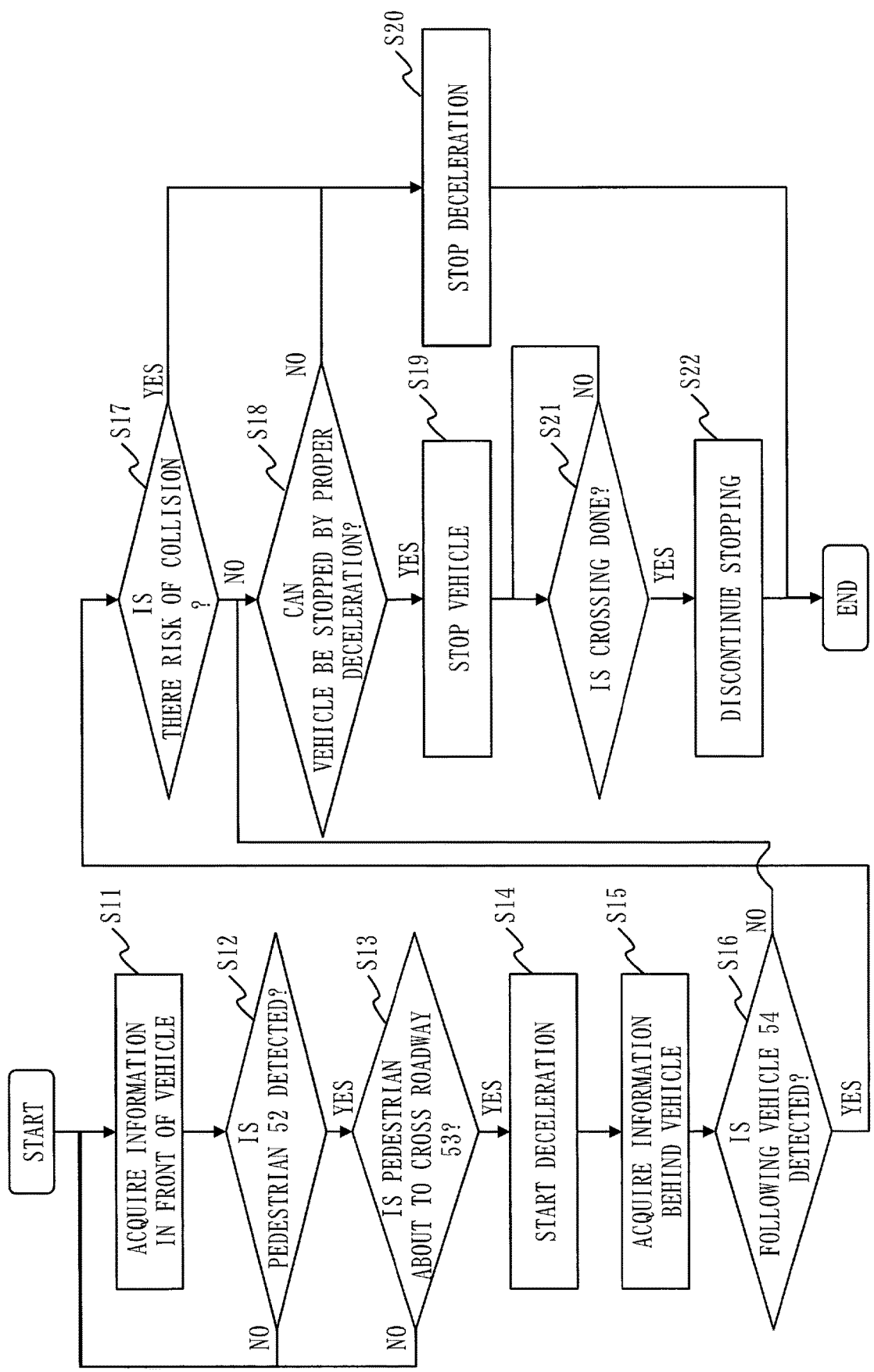
FIG. 3 is a flowchart illustrating the operation of the driving assistance system 10 according to the first embodiment.
Figure 4:
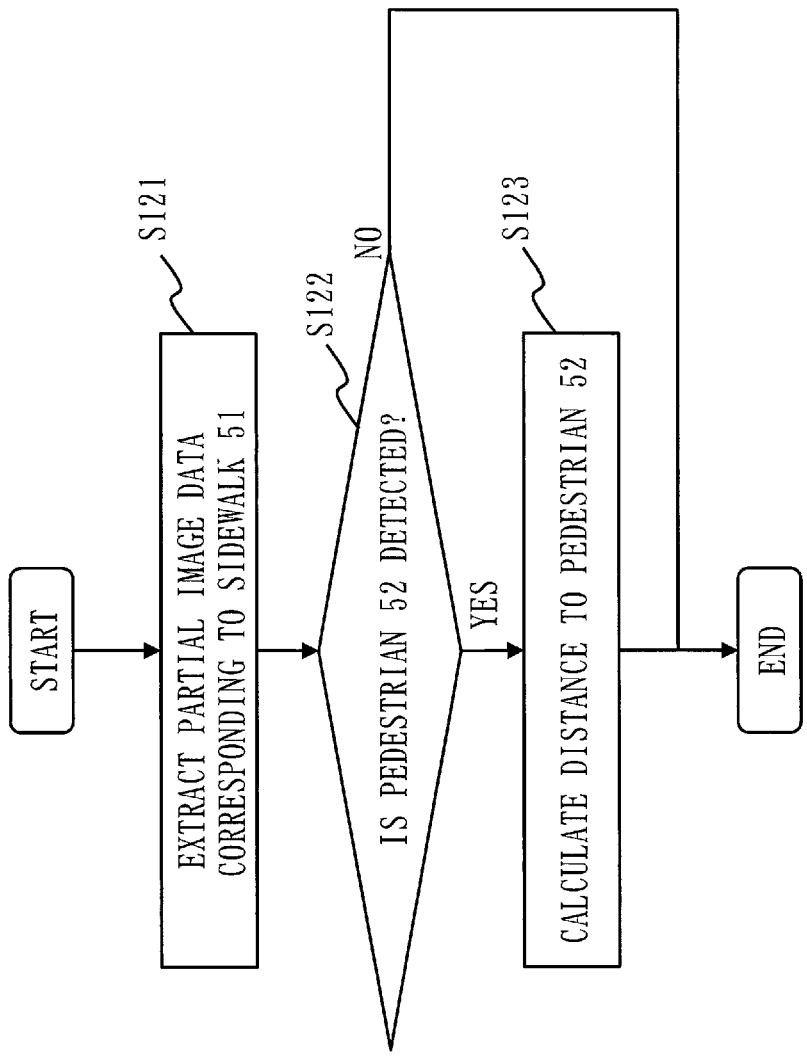
FIG. 4 is a flowchart of step S12 in FIG. 3 according to the first embodiment.

Step S19 of FIG. 3 has the same processing flow as step S14. However, in step S19, the magnitude of deceleration indicated by the parameter generated in step S141 may be higher than that in step S14.

Step S20 of FIG. 3 also has the same processing flow as step S14. However, in step S20, the parameter generated in step S141 indicates quitting of deceleration.

Step S22 of FIG. 3 also has the same processing flow as step S14. However, in step S22, the parameter generated in step S141 indicates lighting of the lamp or the like as well as quitting of deceleration. Step S142 thus controls not only the accelerator and the brake but also the lamp or the like.

Figure 7:
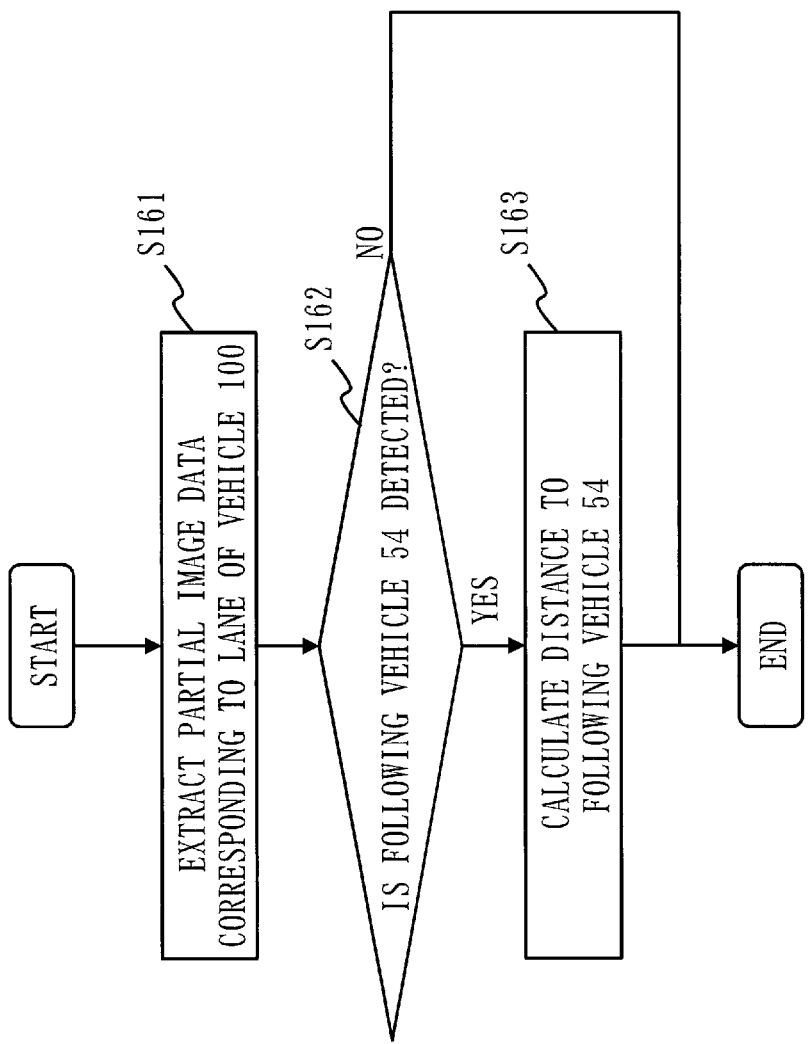
FIG. 7 is a flowchart of step S16 in FIG. 3 according to the first embodiment.

Step S16 in FIG. 3 according to the first embodiment will be described with reference to FIG. 7.

In step S161, the behavior detection unit 22 extracts partial image data corresponding to a lane in which the vehicle 100 travels on the roadway 53 from the image data acquired in step S15.

Specifically, the behavior detection unit 22 identifies a part corresponding to lanes on the roadway 53 by detecting a line drawn on the road or a structure separating the roadway 53 and the sidewalk 51 from the image data, and extracts the partial image data corresponding to the lane in which the vehicle 100 travels among the lanes being identified.

In step S162, the behavior detection unit 22 uses the image recognition technology to detect the following vehicle 54 from the partial image data extracted in step S161.

The image recognition technology specifically refers to pattern matching. That is, the behavior detection unit 22 performs pattern matching with the partial image data by using pattern data for the following vehicle 54 stored in advance in the storage device 12, and detects the following vehicle 54. The pattern data for the following vehicle 54 is data representing a feature that distinguishes the following vehicle 54 and obtained by extracting the outline of the vehicle, for example.

The behavior detection unit 22 advances the processing to step S163 if the following vehicle 54 is detected, or ends the processing if the following vehicle 54 is not detected.

In step S163, the behavior detection unit 22 calculates the distance from the vehicle 100 to the following vehicle 54 detected in step S162 on the basis of the image data and the object information acquired in step S15.

The behavior detection unit 22 calculates the distance by a method such as the motion stereo method, the stereo camera method, or the time-of-flight method.

Figure 8:
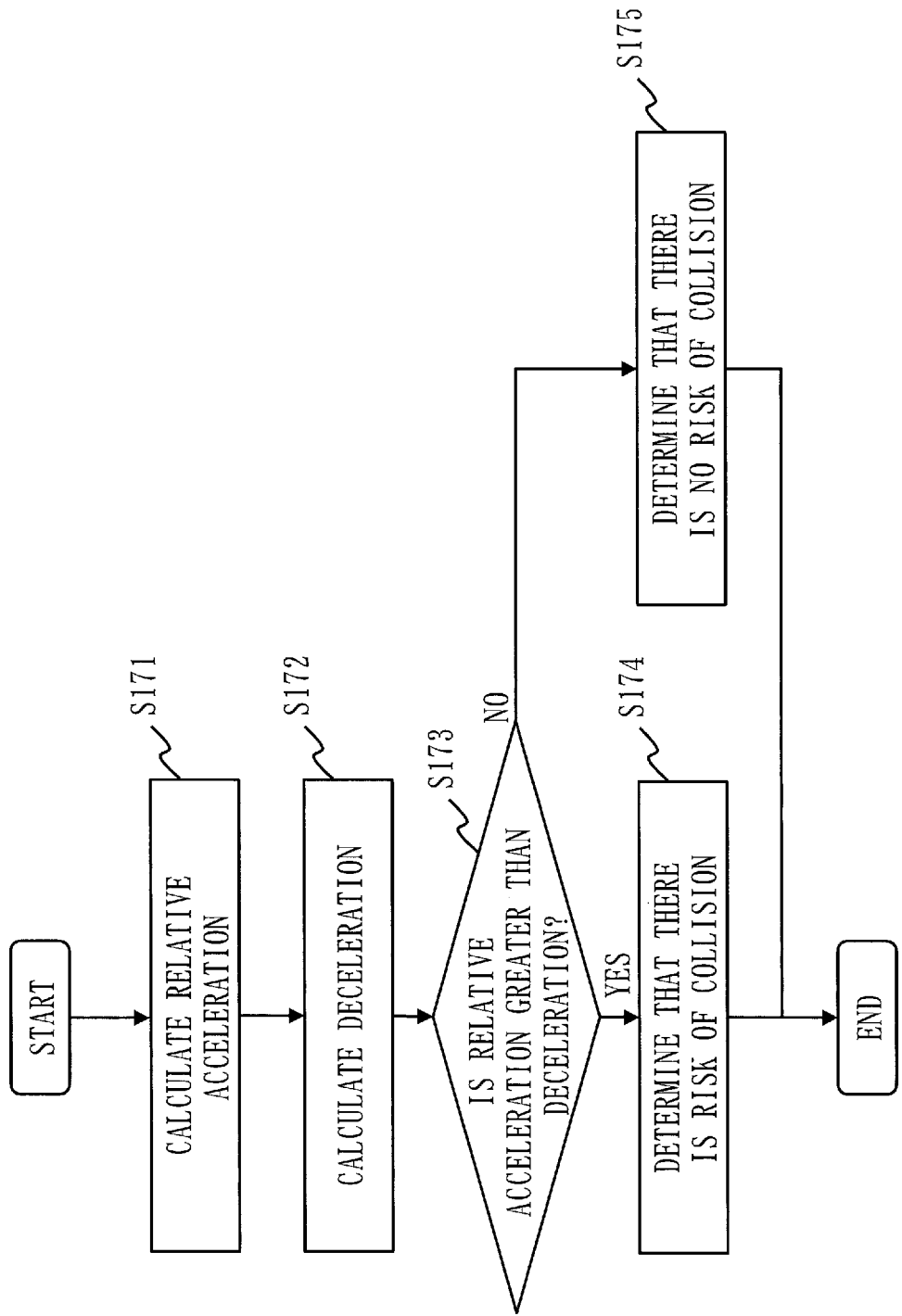
FIG. 8 is a flowchart of step S17 in FIG. 3 according to the first embodiment.

Step S17 in FIG. 3 according to the first embodiment will be described with reference to FIG. 8.

In step S171, the behavior detection unit 22 calculates relative acceleration of the following vehicle 54 with respect to the vehicle 100 from a temporal change in the distance calculated in step S163.

In step S172, the behavior detection unit 22 calculates deceleration of the vehicle 100 from a temporal change in the speed of the vehicle 100 included in the object information acquired in step S15.

In step S173, the behavior detection unit 22 determines whether or not the relative acceleration calculated in step S171 is greater than the deceleration calculated in step S172.

The behavior detection unit 22 advances the processing to step S174 if the relative acceleration is greater than the deceleration, or advances the processing to step S175 if the relative acceleration is less than or equal to the deceleration.

In step S174, the behavior detection unit 22 determines that there is a risk of collision of the following vehicle 54 with the vehicle 100. On the other hand, in step S175, the behavior detection unit 22 determines that there is no risk of collision of the following vehicle 54 with the vehicle 100.

Figure 9:
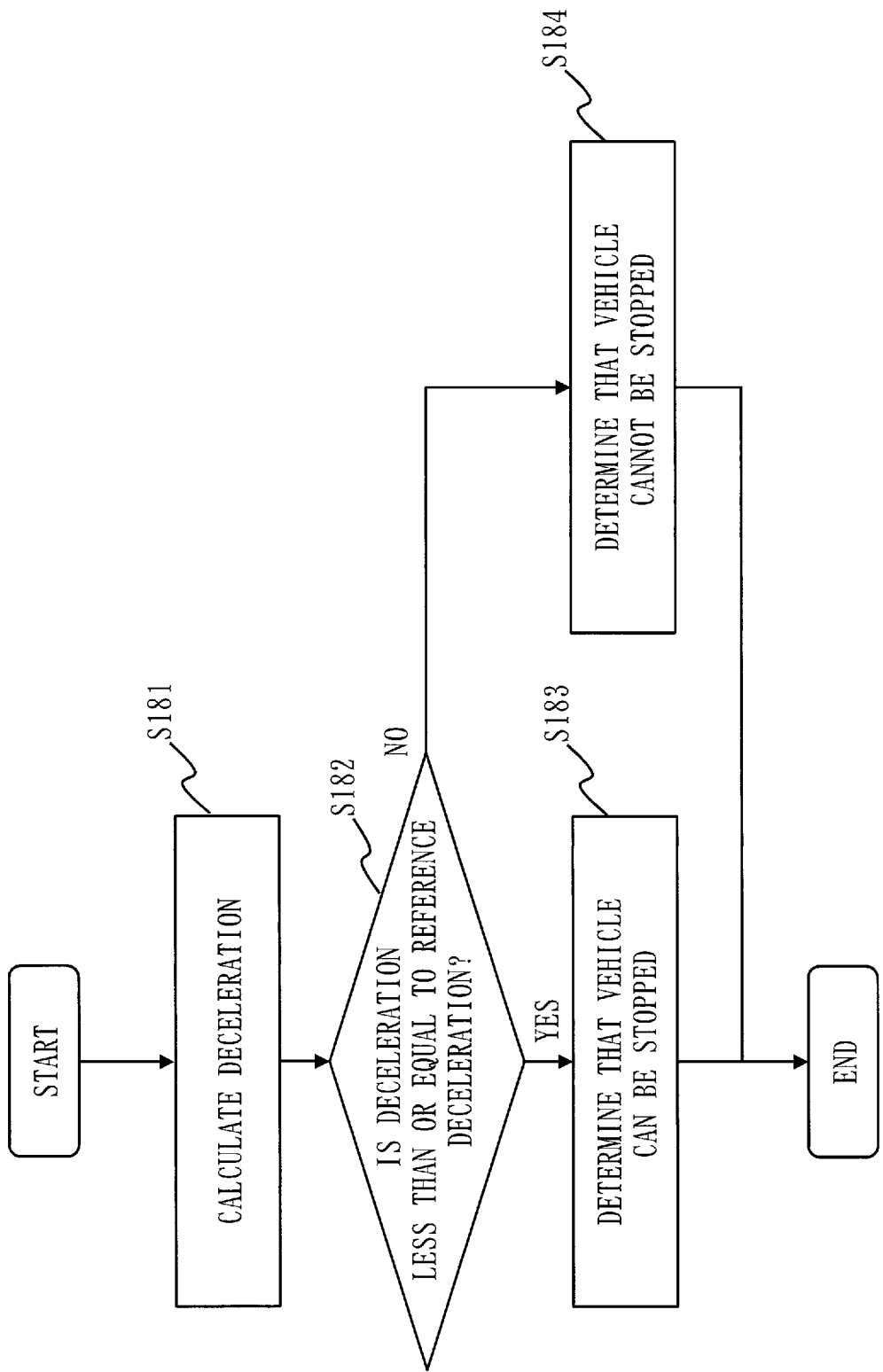
FIG. 9 is a flowchart of step S18 in FIG. 3 according to the first embodiment.

Step S18 in FIG. 3 according to the first embodiment will be described with reference to FIG. 9.

In step S181, the stop determination unit 23 calculates deceleration required to stop the vehicle 100 before the pedestrian 52 on the basis of the speed of the vehicle 100 included in the object information acquired in step S15 and the distance to the pedestrian 52 calculated in step S123.

In step S182, the stop determination unit 23 advances the processing to step S183 if the deceleration calculated in step S181 is less than or equal to reference deceleration, or advances the processing to step S184 if the deceleration is greater than the reference deceleration.

In step S183, the stop determination unit 23 determines that the vehicle can be stopped. In step S184, on the other hand, the stop determination unit 23 determines that the vehicle cannot be stopped.

Figure 10:
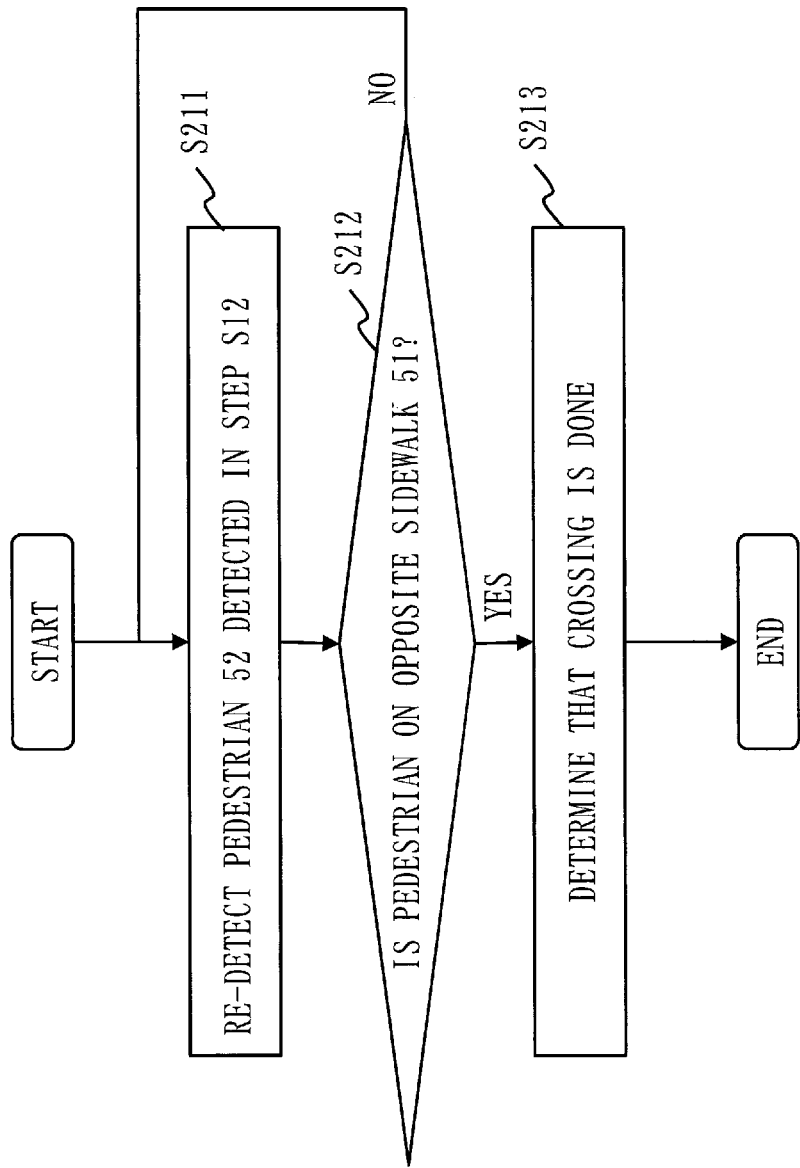
FIG. 10 is a flowchart of step S21 in FIG. 3 according to the first embodiment.

Step S21 in FIG. 3 according to the first embodiment will be described with reference to FIG. 10.

In step S211, the crossing detection unit 21 uses the image recognition technology to re-detect the pedestrian 52 detected in step S12 from the image data acquired in step S11.

Specifically, the crossing detection unit 21 performs pattern matching by using the image data of the pedestrian 52 detected in step S12 as pattern data, thereby re-detecting the pedestrian 52 detected in step S12.

In step S212, the crossing detection unit 21 determines whether or not the position of the pedestrian 52 detected in step S211 corresponds to a sidewalk 51 on the opposite side of the roadway 53 from the sidewalk 51 detected in step S12.

The crossing detection unit 21 advances the processing to step S213 if the position corresponds to the sidewalk 51 on the opposite side, or returns the processing to step S211 if the position does not correspond to the sidewalk 51 on the opposite side.

In step S213, the crossing detection unit 21 determines that the pedestrian 52 is done crossing the roadway.

Effects of First Embodiment

As described above, the driving assistance system 10 according to the first embodiment determines whether or not to stop the vehicle 100 depending on the behavior of the nearby vehicle 200 when the pedestrian 52 who is about to cross the roadway 53 is detected. Therefore, a determination on whether or not to stop the vehicle 100 can be made appropriately.

In particular, the driving assistance system 10 according to the first embodiment determines whether or not to stop the vehicle 100 depending on the behavior of the following vehicle 54. This can prevent the following vehicle 54 from colliding with the vehicle 100.

Another Configuration

<First Variation>

In the first embodiment, the crossing detection unit 21 in step S21 of FIG. 3 determines whether or not the pedestrian 52 is done crossing the roadway 53 on which the vehicle 100 travels from the position of the pedestrian 52.

However, as a first variation, the crossing detection unit 21 in step S21 may further determine that the pedestrian 52 does not intend to cross the roadway 53 if the pedestrian 52 does not start crossing the roadway for reference time or longer. At this time, as in step S13, the intention of the pedestrian 52 to cross may be determined with reference to the traveling speed and the orientation of the body of the pedestrian 52.

Even when it is determined that the pedestrian 52 does not intend to cross, the crossing detection unit 21 advances the processing to step S22, in which the stop determination unit 23 determines to discontinue the stopping of the vehicle 100.

<Second Variation>

In the first embodiment, the function of each unit of the driving assistance system 10 is implemented in software. However, as a second variation, the function of each unit of the driving assistance system 10 may be implemented in hardware. The second variation will be described focusing on the difference from the first embodiment.

Figure 11:
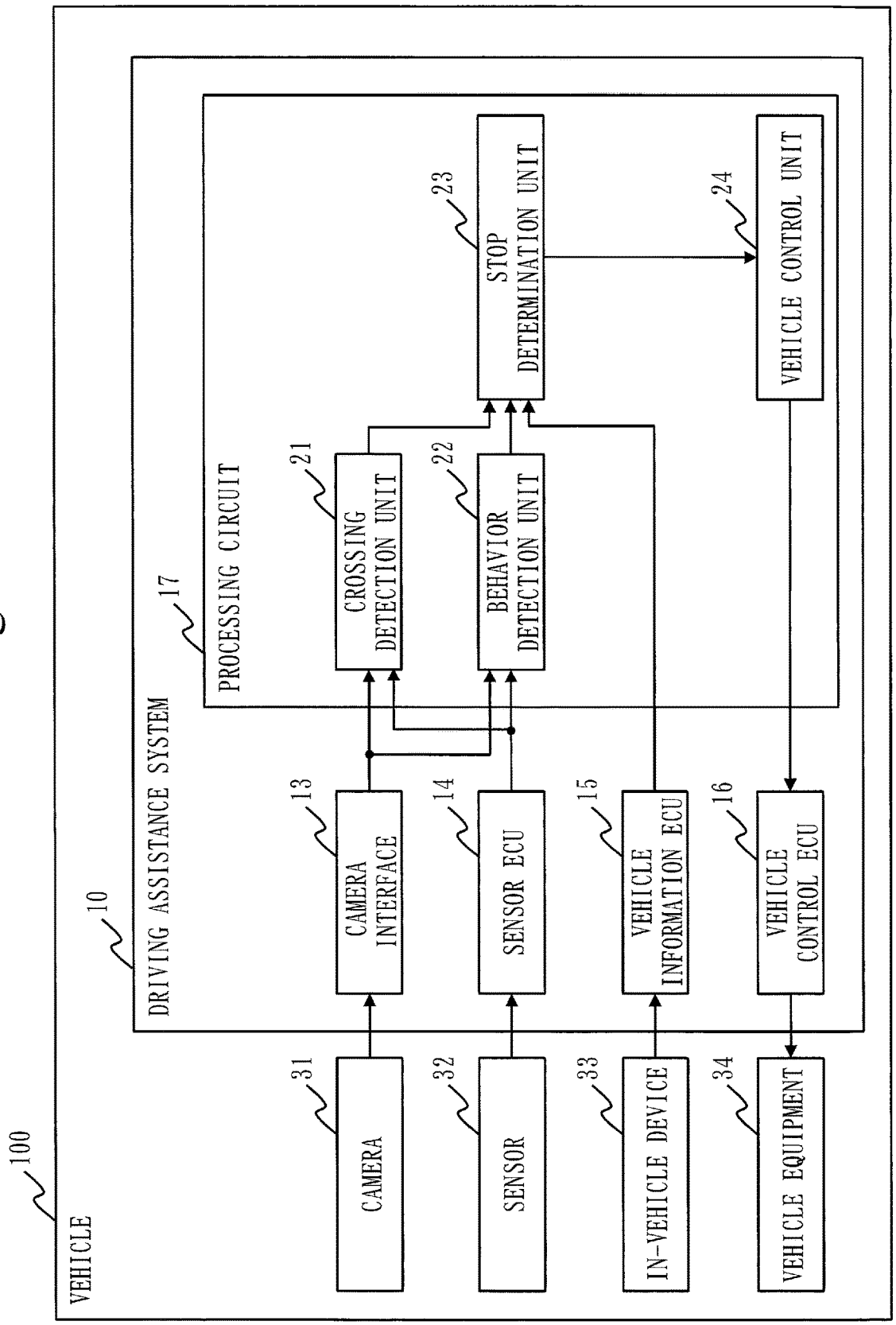
FIG. 11 is a block diagram of the driving assistance system 10 according to a second variation.

The configuration of the driving assistance system 10 according to the second variation will be described with reference to FIG. 11.

When the function of each unit is implemented in hardware, the driving assistance system 10 includes a processing circuit 17 in place of the processor 11 and the storage device 12. The processing circuit 17 is a dedicated electronic circuit for implementing the function of each unit of the driving assistance system 10 and the function of the storage device 12.

The processing circuit 17 can be a single circuit, a composite circuit, a programmed processor, a parallel programmed processor, a logic IC, a gate array (GA), an application specific integrated circuit (ASIC), or a field-programmable gate array (FPGA).

The functions of the units may be implemented by one processing circuit 17 or may be distributed into a plurality of the processing circuits 17 to be implemented.

<Third Variation>

As a third variation, some functions may be implemented in hardware while other functions may be implemented in software. That is, some functions of the units included in the driving assistance system 10 may be implemented in hardware while other functions may be implemented in software.

The processor 11, the storage device 12, and the processing circuit 17 are collectively referred to as "processing circuitry". In other words, the functions of the units are implemented by the processing circuitry.

Second Embodiment

A second embodiment is different from the first embodiment in that whether or not to stop a vehicle 100 is determined depending on the behavior of an oncoming vehicle 55 traveling in the opposite direction to the vehicle 100. This difference will be described in the second embodiment.

Description of Configuration

A driving assistance system 10 according to the second embodiment has the same configuration as the driving assistance system 10 according to the first embodiment illustrated in FIG. 1.

Description of Operation

The operation of the driving assistance system 10 according to the second embodiment will be described with reference to FIGS. 12 to 15.

The operation of the driving assistance system 10 according to the second embodiment corresponds to a driving assistance method according to the second embodiment. The operation of the driving assistance system 10 according to the second embodiment further corresponds to processing of a driving assistance program according to the second embodiment.

Figure 12:
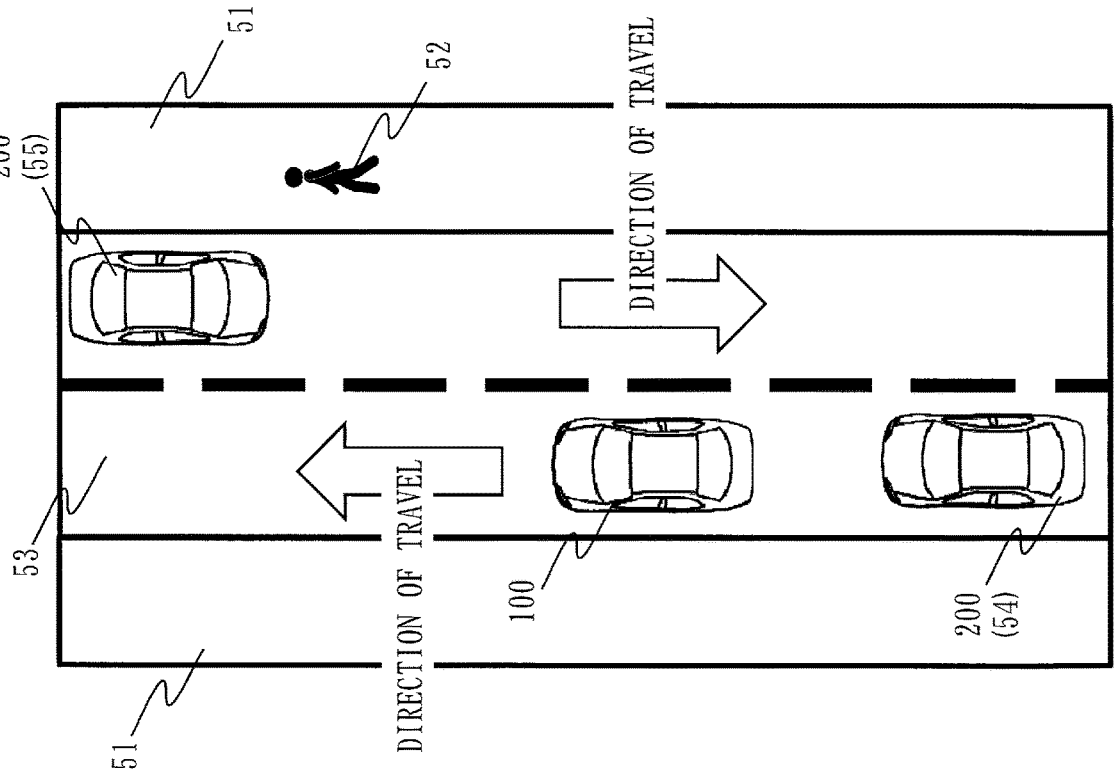
FIG. 12 is an illustrative diagram of an overview of the operation of a driving assistance system 10 according to a second embodiment.

The overview of the operation of the driving assistance system 10 according to the second embodiment will be described with reference to FIG. 12.

There is a case where a nearby vehicle 200 traveling around the vehicle 100 includes the oncoming vehicle 55 traveling in the opposite direction to the vehicle 100 in addition to a following vehicle 54. In the presence of the oncoming vehicle 55, a pedestrian 52 cannot cross a roadway 53 unless not only the vehicle 100 but also the oncoming vehicle 55 is stopped. A behavior detection unit 22 thus uses a camera 31 and a sensor 32 to detect, as a behavior, the speed of the oncoming vehicle 55 which is the nearby vehicle 200 traveling in the opposite direction to the vehicle 100. Then if the oncoming vehicle 55 is decelerating or stopped, a stop determination unit 23 determines to stop the vehicle 100 regardless of whether or not the pedestrian 52 is about to cross the roadway 53. On the other hand, if a change in the speed indicates that the oncoming vehicle 55 is not decelerating or stopped, the stop determination unit 23 determines whether or not to stop the vehicle 100 depending on whether or not the pedestrian 52 is about to cross the roadway 53.

Figure 13:
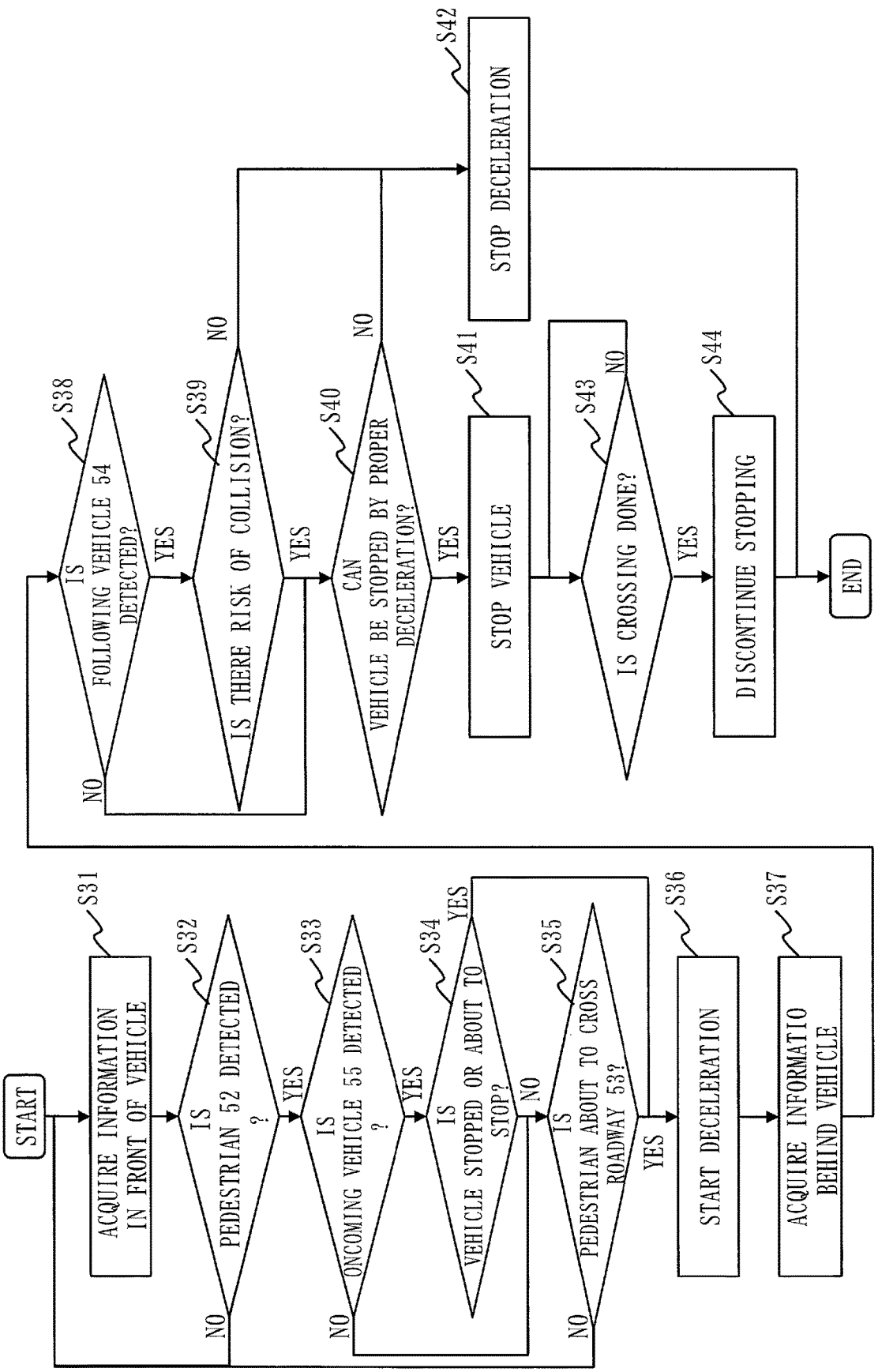
FIG. 13 is a flowchart illustrating the operation of the driving assistance system 10 according to the second embodiment.

The detailed operation of the driving assistance system 10 according to the second embodiment will be described with reference to FIG. 13.

Steps S31 to S32 are the same as steps S11 to S12 of FIG. 3.

In step S33, the behavior detection unit 22 detects the oncoming vehicle 55 traveling in the opposite direction to the vehicle 100 from image data and object information acquired in step S31.

The behavior detection unit 22 advances the processing to step S34 if the oncoming vehicle 55 is detected at a position that is farther from the vehicle 100 than the pedestrian 52 is, or advances the processing to step S35 if the oncoming vehicle is not detected.

In step S34, the behavior detection unit 22 determines whether the oncoming vehicle 55 detected in step S33 is about to stop before the pedestrian 52 or is stopped before the pedestrian 52.

The behavior detection unit 22 advances the processing to step S36 if the oncoming vehicle is in either situation, or advances the processing to step S35 if the oncoming vehicle is in neither situation.

Steps S35 to S44 are the same as steps S13 to S22 of FIG. 3.

Figure 14:
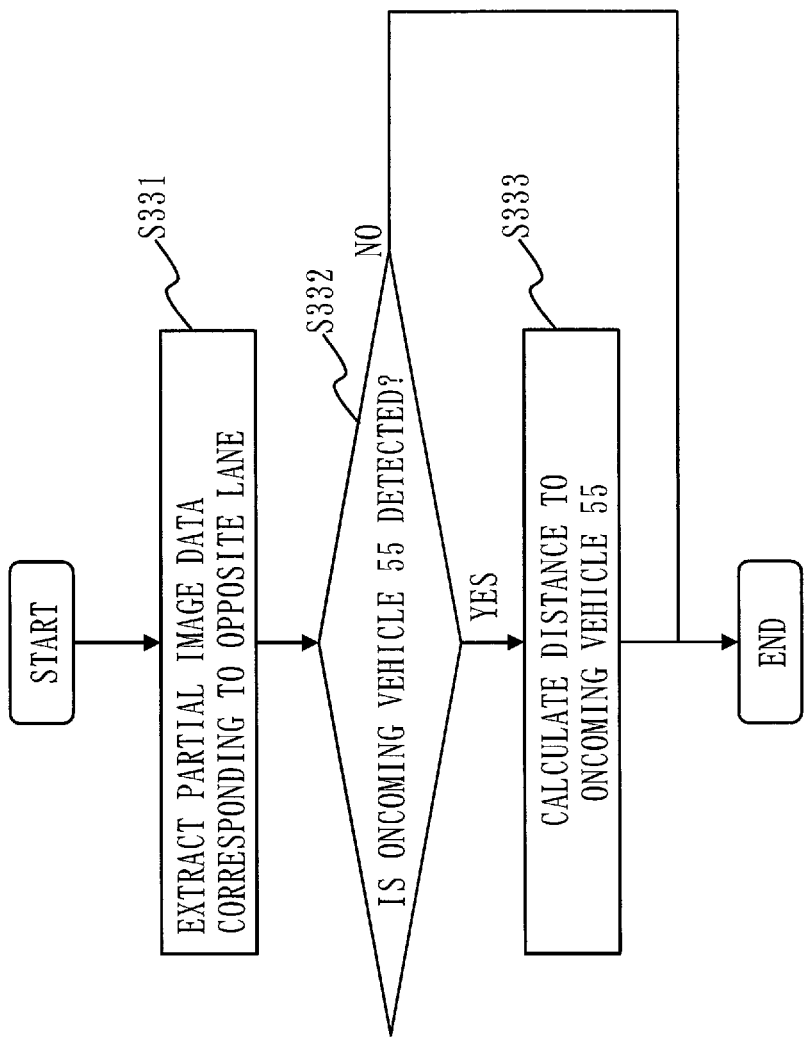
FIG. 14 is a flowchart of step S33 in FIG. 13 according to the second embodiment.

Step S33 in FIG. 13 according to the second embodiment will be described with reference to FIG. 14.

In step S331, the behavior detection unit 22 extracts partial image data corresponding to a lane opposite to a lane in which the vehicle 100 travels on the roadway 53 from the image data acquired in step S31.

Specifically, the behavior detection unit 22 identifies a part corresponding to lanes on the roadway 53 by detecting a line drawn on the road or a structure separating the roadway 53 and a sidewalk 51 from the image data, and extracts the partial image data corresponding to the opposite lane among the lanes being identified. Note that when the road does not have separate lanes, the behavior detection unit 22 may extract partial image data of the entire roadway 53.

In step S332, the behavior detection unit 22 uses an image recognition technology to detect the oncoming vehicle 55 from the partial image data extracted in step S331.

The image recognition technology specifically refers to pattern matching. That is, the behavior detection unit 22 performs pattern matching with the partial image data by using pattern data for the oncoming vehicle 55 stored in advance in a storage device 12, and detects the oncoming vehicle 55. The pattern data for the oncoming vehicle 55 is data representing a feature that distinguishes the oncoming vehicle 55 and obtained by extracting the outline of the vehicle, for example.

In step S333, the behavior detection unit 22 calculates the distance from the vehicle 100 to the oncoming vehicle 55 detected in step S332 on the basis of the image data and the object information acquired in step S31.

The behavior detection unit 22 calculates the distance by a method such as the motion stereo method, the stereo camera method, or the time-of-flight method.

When the distance to the oncoming vehicle 55 is closer than the distance to the pedestrian 52, the behavior detection unit 22 assumes that the oncoming vehicle 55 is not detected and advances the processing to step S35.

Step S34 in FIG. 13 according to the second embodiment will be described with reference to FIG. 15.

In step S341, the behavior detection unit 22 calculates relative speed of the vehicle 100 with respect to the oncoming vehicle 55 from a temporal change in the distance calculated in step S333.

In step S342, the behavior detection unit 22 determines whether or not the relative speed calculated in step S341 is equal to the speed of the vehicle 100 included in the object information acquired in step S31.

The behavior detection unit 22 advances the processing to step S344 if the relative speed is equal to the speed of the vehicle 100, or advances the processing to step S343 if the relative speed is not equal to the speed of the vehicle 100.

In step S343, the behavior detection unit 22 determines whether or not the relative speed calculated in step S341 is gradually decreased.

The behavior detection unit 22 advances the processing to step S345 if the relative speed is gradually decreased, or advances the processing to step S346 if the relative speed is not gradually decreased.

In step S344, the behavior detection unit 22 determines that the oncoming vehicle 55 is stopped before the pedestrian 52. In step S345, the behavior detection unit 22 determines that the oncoming vehicle 55 is about to stop before the pedestrian 52. In step S346, the behavior detection unit 22 determines that the oncoming vehicle 55 is neither about to stop before the pedestrian 52 nor stopped before the pedestrian 52.

Effects of Second Embodiment

As described above, the driving assistance system 10 according to the second embodiment determines whether or not to stop the vehicle 100 depending on the behavior of the oncoming vehicle 55. Therefore, a determination on whether or not to stop the vehicle 100 can be made appropriately.

Another Configuration

As in the first embodiment, the function of each unit of the driving assistance system 10 is implemented in software in the second embodiment. However, as with the second variation of the first embodiment, the function of each unit of the driving assistance system 10 may be implemented in hardware. Alternatively, as with the third variation of the first embodiment, some functions of the driving assistance system 10 may be implemented in hardware while other functions may be implemented in software.

Third Embodiment

The first and second embodiments stop the vehicle 100 by controlling the brake of the vehicle 100 when it is determined to stop the vehicle 100. A third embodiment is different from the first and second embodiments in that a notification is made when it is determined to stop the vehicle 100 or the like. This difference will be described in the third embodiment.

The third embodiment will describe a case where a function is added to the first embodiment. It is however possible to add a function to the second embodiment as well.

Description of Configuration

A driving assistance system 10 according to the third embodiment has the same configuration as the driving assistance system 10 according to the first embodiment illustrated in FIG. 1.

Description of Operation

The operation of the driving assistance system 10 according to the third embodiment will be described with reference to FIGS. 2 to 3.

The operation of the driving assistance system 10 according to the third embodiment corresponds to a driving assistance method according to the third embodiment. The operation of the driving assistance system 10 according to the third embodiment further corresponds to processing of a driving assistance program according to the third embodiment.

The overview of the operation of the driving assistance system 10 according to the third embodiment will be described with reference to FIG. 2.

A pedestrian 52 who is about to cross a roadway 53 on which the vehicle 100 travels is detected. A vehicle control unit 24 then notifies a driver of the detection of the pedestrian 52 who is about the cross the roadway 53 by a method such as turning on a lamp that is installed around a driver's seat of the vehicle 100 to inform of the presence of the pedestrian 52, or outputting a sound to inform of the presence of the pedestrian 52.

When the pedestrian 52 who is about to cross the roadway 53 is detected, it is further determined that there is a risk of collision of a following vehicle 54 with the vehicle 100. The vehicle control unit 24 then notifies the driver of the detection of the following vehicle 54 by a method such as turning on a lamp that is installed around the driver's seat of the vehicle 100 to inform of the presence of the following vehicle 54, or outputting a sound to inform of the presence of the following vehicle 54.

Moreover, when a stop determination unit 23 determines to stop the vehicle 100, the vehicle control unit 24 notifies a nearby vehicle 200 such as the following vehicle 54 about stopping of the vehicle 100 by a method such as blinking a hazard lamp. Furthermore, when the vehicle 100 is stopped, the pedestrian 52 is notified that he can cross the roadway by a method such as sounding of a horn or turning on of a headlight.

The detailed operation of the driving assistance system 10 according to the third embodiment will be described with reference to FIG. 3.

Steps S11 to S13, steps S15 to S18, and steps S21 to S22 are the same as those in the first embodiment.

In step S14, the vehicle control unit 24 starts decelerating the vehicle 100 as in the first embodiment, and notifies the driver of the presence of the pedestrian 52 who is about to cross the roadway 53 by the method such as turning on the lamp or outputting the sound.

In step S19, the vehicle control unit 24 stops the vehicle 100 as in the first embodiment, and notifies the following vehicle 54 of stopping of the vehicle 100 by the method such as blinking the hazard lamp. Furthermore, when the vehicle 100 is stopped, the vehicle control unit 24 notifies the pedestrian 52 that he can cross the roadway by the method such as sounding the horn or turning on the headlight.

In step S20, the vehicle control unit 24 discontinues decelerating the vehicle 100 as in the first embodiment, and notifies the driver of the presence of the following vehicle 54 by the method such as turning on the lamp or outputting the sound.

Effects of Third Embodiment

As described above, the driving assistance system 10 according to the third embodiment makes the notification when it is determined to stop the vehicle 100 or the like. This can alert the driver of the vehicle 100 or the like.

Specifically, a notification made when the pedestrian 52 is detected and when a risk of collision with the following vehicle 54 is determined can alert the driver of the vehicle 100 to the pedestrian 52 and the following vehicle 54. Moreover, notifying the following vehicle 54 when the vehicle 100 is to be stopped can alert a driver of the following vehicle 54 to stopping of the vehicle 100. Furthermore, notifying the pedestrian 52 when the vehicle 100 is stopped can encourage the pedestrian 52 to cross.

Another Configuration

As in the first embodiment, the function of each unit of the driving assistance system 10 is implemented in software in the third embodiment. However, as with the second variation of the first embodiment, the function of each unit of the driving assistance system 10 may be implemented in hardware. Alternatively, as with the third variation of the first embodiment, some functions of the driving assistance system 10 may be implemented in hardware while other functions may be implemented in software.

REFERENCE SIGNS LIST

10: driving assistance system, 11: processor, 12: storage device, 121: memory, 122: storage, 13: camera interface, 14: sensor ECU, 15: vehicle Information ECU, 16: vehicle control ECU, 21: crossing detection unit, 22: behavior detection unit, 23: stop determination unit, 24: vehicle control unit, 31: camera, 32: sensor, 33: in-vehicle device, 34: vehicle equipment, 51: sidewalk, 52: pedestrian, 53: roadway, 54: following vehicle, 55: oncoming vehicle, 100: vehicle, 200: nearby vehicle.

The invention claimed is:

1. A driving assistance system comprising:
   processing circuitry
   to detect a pedestrian who is about to cross a roadway on which a vehicle travels,
   to detect relative acceleration of a nearby vehicle with respect to the vehicle when the nearby vehicle is traveling directly behind the vehicle,
   to determine whether or not to stop the vehicle in view of detection of the pedestrian who is about to cross the roadway and the relative acceleration of the nearby vehicle detected, said determination being made to prevent a potential rear end collision with the nearby vehicle, and
   to stop the vehicle before reaching the pedestrian when determining to stop the vehicle.

2. The driving assistance system according to claim 1, wherein
   the processing circuitry determines not to stop the vehicle when the relative acceleration is greater than deceleration of the vehicle.

3. The driving assistance system according to claim 2, wherein the processing circuitry starts deceleration when the pedestrian who is about to cross the roadway is detected, and stops the deceleration when determining not to stop the vehicle.

4. The driving assistance system according to claim 1, wherein the processing circuitry detects speed of an oncoming vehicle, which is traveling opposite to the vehicle.

5. The driving assistance system according to claim 4, wherein the processing circuitry determines to stop the vehicle when the oncoming vehicle decelerates or is stopped.

6. The driving assistance system according to claim 1, wherein the processing circuitry notifies the pedestrian that he can cross the roadway when the vehicle is stopped.

7. The driving assistance system according to claim 1, wherein the processing circuitry detects that the pedestrian stops crossing the roadway after the vehicle is stopped.

8. A driving assistance system comprising:

processing circuitry to detect a pedestrian who is about to cross a roadway on which a vehicle travels, to detect a behavior of a nearby vehicle when the nearby vehicle is traveling directly behind the vehicle, to determine whether or not to stop the vehicle in view of detection of the pedestrian who is about to cross the roadway and the behavior of the nearby vehicle detected, said determination being made to prevent a potential rear end collision with the nearby vehicle, and to stop the vehicle before reaching the pedestrian when determining to stop the vehicle, and notify a driver of the vehicle that the pedestrian who is about to cross the roadway is detected and that the nearby vehicle traveling behind the vehicle is detected.

9. The driving assistance system according to claim 8, wherein the processing circuitry detects speed of an oncoming vehicle, which is traveling opposite to the vehicle.

10. The driving assistance system according to claim 9, wherein the processing circuitry determines to stop the vehicle when the oncoming vehicle decelerates or is stopped.

11. The driving assistance system according to claim 8, wherein the processing circuitry notifies the pedestrian that he can cross the roadway when the vehicle is stopped.

12. The driving assistance system according to claim 8, wherein the processing circuitry detects that the pedestrian stops crossing the roadway after the vehicle is stopped.

13. A driving assistance system comprising:

processing circuitry to detect a pedestrian who is about to cross a roadway on which a vehicle travels, to detect a behavior of a nearby vehicle when the nearby vehicle is traveling behind the vehicle, to determine whether or not to stop the vehicle in view of detection of the pedestrian who is about to cross the roadway and the behavior of the nearby vehicle detected, and to stop the vehicle before reaching the pedestrian when determining to stop the vehicle, and notify the nearby vehicle that the vehicle is to be stopped when it is determined to stop the vehicle.

14. The driving assistance system according to claim 13, wherein the processing circuitry detects speed of an oncoming vehicle, which is traveling opposite to the vehicle.

15. The driving assistance system according to claim 14, wherein the processing circuitry determines to stop the vehicle when the oncoming vehicle decelerates or is stopped.

16. The driving assistance system according to claim 13, wherein the processing circuitry notifies the pedestrian that he can cross the roadway when the vehicle is stopped.

17. The driving assistance system according to claim 13, wherein the processing circuitry detects that the pedestrian stops crossing the roadway after the vehicle is stopped.

18. The driving assistance system according to claim 13, wherein the processing circuitry notifies the nearby vehicle that the vehicle is to be stopped by blinking a hazard lamp.

* * * * *